United States Patent [19]
Emma et al.

[11] Patent Number: 5,353,421
[45] Date of Patent: Oct. 4, 1994

[54] MULTI-PREDICTION BRANCH PREDICTION MECHANISM

[75] Inventors: Philip G. Emma, Danbury, Conn.; Joshua W. Knight, Mohegan Lake; James H. Po merene, Chappaqua, both of N.Y.; Thomas R. Puzak, Ridgefield, Conn.; Rudolph N. Rechtschaffen, Scarsdale; James R. Robinson, Clinton Corners, both of N.Y.

[73] Assignee: International Business Machines Corporation, Armonk, N.Y.

[21] Appl. No.: 91,416

[22] Filed: Jul. 13, 1993

Related U.S. Application Data

[63] Continuation of Ser. No. 594,529, Oct. 9, 1990, abandoned.

[51] Int. Cl.⁵ .............................................. G06F 9/38
[52] U.S. Cl. ............................ 395/375; 364/261.3; 364/261.5; 364/263.1; 364/255.7; 364/231.8; 364/DIG. 1

[58] Field of Search .................... 395/375, 800

[56] References Cited

U.S. PATENT DOCUMENTS

| | | | |
|---|---|---|---|
| 4,853,840 | 8/1989 | Shibuya | 395/375 |
| 4,894,772 | 1/1990 | Langendrof | 395/375 |
| 4,943,908 | 7/1990 | Emma et al. | 395/375 |
| 5,121,473 | 5/1992 | Hodges | 395/375 |
| 5,142,634 | 8/1992 | Fite et al. | 395/375 |

Primary Examiner—P. S. Lall
Assistant Examiner—Ayni Mohamed
Attorney, Agent, or Firm—Whitman, Curtis, Whitman & McGinn

[57] ABSTRACT

A multi-prediction branch prediction mechanism predicts each conditional branch at least twice, first during the instruction-fetch phase of the pipeline and then again during the decode phase of the pipeline. The mechanism uses at least two different branch prediction mechanisms, each a separate and independent mechanism from the other. A set of rules are used to resolve those instances as to when the predictions differ.

9 Claims, 10 Drawing Sheets

FIG. 7A

BHT INST-FETCH/DECODE ALGORITHM

|  | INST-FETCH-TIME | DECODE-TIME |
|---|---|---|
| BHT HIT | FETCH TARGET OF BRANCH | DECODE TARGET OF BRANCH |
| BHT MISS | FETCH NEXT-SEQUENTIAL INST | DECODE NEXT-SEQUENTIAL INST |

FIG. 7B

DHT INST-FETCH/DECODE ALGORITHM

|  | INST-FETCH-TIME | DECODE-TIME |
|---|---|---|
| DHT HIT | FETCH NEXT-SEQUENTIAL INST | • FETCH-TARGET INST<br>• DECODE TARGET INST |
| DHT MISS | FETCH NEXT-SEQUENTIAL INST | • FETCH NEXT-SEQUENTIAL INST<br>• DECODE NEXT-SEQUENTIAL INST |

FIG. 8

|  |  | DHT MISS | | DHT HIT | |
|---|---|---|---|---|---|
|  |  | INST-FETCH TIME | DECODE-TIME | INST-FETCH TIME | DECODE-TIME |
| BHT HIT | VALID | FETCH-TARGET OF BRANCH | DECODE TARGET OF BRANCH | FETCH-TARGET OF BRANCH | DECODE TARGET OF BRANCH |
| BHT HIT | GHOST | FETCH-NEXT SEQUENTIAL INST | DECODE NEXT-SEQUENTIAL | FETCH-NEXT SEQUENTIAL INST | DECODE-NEXT-SEQUENTIAL |
| BHT MISS |  | FETCH-NEXT SEQUENTIAL INST | DECODE NEXT-SEQUENTIAL | FETCH-NEXT-SEQUENTIAL | • FETCH-TARGET-OF BRANCH<br>• DECODE TARGET-OF BRANCH |

MULTI-PREDICTION BRANCH PREDICTION MECHANISM

This is a continuation of application Ser. No. 07/594,529 filed Oct. 9, 1990 and now abandoned.

BACKGROUND OF THE INVENTION

1. Field of the Invention

The present invention generally relates to the field of data processing and, more particularly, to predicting the outcome of conditional branches, either taken or not taken, in the processor of a computer.

2. Description of the Prior Art

In most high performance processors, pipelining is used as a means to improve performance. Pipelining allows a processor to be divided into separate components where each component is responsible for completing a different phase of an instruction's execution. For example, FIG. 1 shows the major components that make up a processor's pipeline. The components are: Instruction fetch (stage I), instruction decode and address generation (stage II), operand fetch (stage III), instruction execution (stage IV), and put away of the results (stage V). Each instruction enters the pipeline and ideally spends one cycle at each stage of the pipeline. Individually, each instruction takes five cycles to pass through the pipeline. However, if the pipeline can be kept full then each component of the processor (pipeline stage) can be kept actively working on a different instruction, each at a different pipeline stage, and one instruction can complete in every cycle. Unfortunately, keeping the pipeline full is a difficult task. Breaks in the pipeline, disruptions, frequently occur and result in idle cycles that can delay an instruction's execution.

The branch instruction is one of the major causes of a pipeline disruption. The branch instruction introduces a temporary uncertainty into the pipeline because, in order to keep the pipeline full, the processor must guess which one of two possible instructions enters the pipeline next; the fall through instruction or the target of the branch. Most high performance processors will guess the outcome of the branch before it executes and then proceed to fetch and decode instructions down the path that is guessed (either taken or not taken).

By attempting to predict the outcome of the branch, the processor can keep the pipeline full of instructions and, if the outcome of the branch is guessed correctly, avoid a pipeline disruption. If the branch was guessed incorrectly, for example a guess of not taken and the branch is actually taken, then any of the instructions that entered the pipeline following the branch are canceled and the pipeline restarts at the correct instruction.

Several patents are directed to branch prediction mechanisms, each having certain advantages and disadvantages. Many are based on the observation that most branches are consistently either taken or not taken, and if treated individually, consistently branch to the same target-address. For example, U.S. Pat. No. 4,477,872 to Losq et al. describes a mechanism by which each conditional branch is predicted based on the previous performance of the actions. A table is maintained that records the actions of each conditional branch, either taken or not taken. Each entry of the table consists of a one bit value, either a one or zero, indicating if the branch is taken or not taken, respectively. The table is assessed, using a subset of the address bits that make up the branch, each time a conditional branch is decoded. The table is referred to as a Decode History Table (DHT), and combinatorial logic determines the guess from the value found in the table. No attempt is made to predict the branch target, since this is known at decode time; just the outcome of the branch is predicted. The DHT is used to predict the outcome of only the conditional branches since the outcome of each unconditional branch is explicitly known once it is decoded.

U.S. Pat. No. 3,325,785 to Stephens describes a mechanism by which the outcome of branch is predicted based on the type of branch and statistical experience as to whether the branch will be taken. Another branch strategy describes suspending the pipeline until the branch is fully executed. The outcome of the branch is then known, either taken or not taken, and the correct instruction can then be fetched and processed through the pipeline. This strategy, however, results in several cycles of pipeline delay (idle cycles) per branch.

U.S. Pat. No. 4,181,942 to Forster et al. describes a mechanism by which a special branch instruction is used in a processor to indicate the type of branch, either conditional or unconditional as determined by the state of an internal register. The special branch instruction is used for program control at the end of a program loop and for unconditional branching outside of the loop.

U.S. Pat. No. 4,200,927 to Hughes et al. describes a mechanism by which multiple instruction buffers are addressed and filled based on the prediction of each branch that is encountered in the instruction stream. The prefetching of instructions into each instruction buffer and the selection of one of the instruction buffers for gating instructions into the decoder is controlled by logic which keeps track of the status of each instruction stream and branch contained in each instruction buffer. Branches are guessed based on their type, and result signals from the instruction execution unit, in response to the execution of conditional branch instructions, will control the setting of various pointers to allocate new instruction streams to instruction buffers and to de-allocate or reset the instructions streams based on the results of branches execution.

A more effective strategy is described in U.S. Pat. No. 3,559,183 to Sussenguth. This patent describes a mechanism that records in a table the address of a set of recently executed branches followed by their target-address. This table is referred to as a Branch History Table (BHT). An entry is made for each taken branch that is encountered by the processor, both conditional and unconditional. The table (BHT) is accessed during the instruction-fetch (I-fetch) phase of the pipeline (stage I of FIG. 1). This allows the BHT to predict the outcome of a branch even before the branch instruction has been decoded. Each instruction fetch made by the processor is compared against each branch address saved in the BHT and, if a match occurs, then a branch is assumed to be taken and the target-address, also in the table, becomes the next instruction-fetch address. In principle, each instruction fetch address found in the table is predicting that a branch instruction will be found at that address and that the branch will be taken to the same address as specified by the target-address saved in the BHT. If no entry is found in the BHT, then it is assumed that there is not a branch within the instruction-fetch address (address of the instruction doubleword that is being fetched) or, if there is a branch, it is not taken. By accessing the BHT during the instruction-fetching phase of the pipeline, an attempt is made to find each taken branch as early as possible and fetch the target-address even before the branch instruction address is decoded. Ideally, this will avoid any pipeline delay caused by taken branches in a pipelined processor. Typically, if a processor waits until a branch is decoded before fetching its target then a pipeline disruption will occur (for each taken branch) because it may take several cycles to fetch the target of the branch from either the cache or memory. By fetching the target of the branch even before the branch is decoded, the BHT offers a significant performance improvement over the previously mentioned branch prediction mechanisms.

U.S. Pat. No. 4,679,141 to Pomerene et al. describes a branch prediction mechanism that improves the BHT as described in U.S. Pat. No. 3,559,183. The BHT is improved by dividing it into two parts; an active area and a backup area. The active area contains entries for a small subset of branches which the processor has encountered and the backup area contains all of the other branch entries. Mechanisms are described to bring entries from the backup area in the active area ahead of when the processor will use those entries. The small size of the active area allows it to be fast and optimally placed in the processor's physical layout.

The prior art patents described above can be divided into two categories; those that make a prediction for a branch at instruction-fetch-time and those that make their prediction at decode-time. In the patents to Hughes et al., Forster et al., Stephens, and Losq et al., each branch is discovered during the decode phase of the pipeline (stage II, of FIG. 1) and a guess is then provided. For this reason, only conditional branches need to be guessed or predicted by the DHT since the branching certainty of all unconditional branches is known after decode time. These patents will be referred to as decode-time branch-prediction mechanisms. Note, that none of these prediction mechanisms attempt to guess the target of the branch since this is precisely known when the branch is decoded. In contrast, the patents to Sussenguth and Pomerene et al. describe making a branch-prediction guess during the instruction-fetch phase of the pipeline (stage I, of FIG. 1) and in doing so must predict the outcome for all taken branches, both conditional and unconditional, and predict the target of each taken branch as well. These patents will be referred to as the instruction-fetch-time branch-prediction mechanisms. Each of the instruction-fetch-time branch-prediction mechanisms represent significantly more hardware than the decode-time branch-prediction mechanisms, but they also offer improved performance to warrant their implementation.

For explanatory purposes a brief comparison of the amount of hardware needed to implement a BHT and DHT is now presented. We begin by comparing the amount of hardware in each table used by the BHT and DHT. Each entry of a BHT consists of two addresses, the branch address followed by the predicted target-address whereas each entry in a DHT is represented by a single bit, indicating if the branch is taken or not taken. Thus, if each address in a BHT is represented as 32 bits, then a BHT with 1K entries consists of 1024, two address pairs (i.e., 1024×64 bits), where each entry is represented by 64 bits. Then, when comparing the relative size of each mechanism we see that a BHT that consists of 1K entries is actually 64 times larger than a DHT that consists of 1K entries.

SUMMARY OF THE INVENTION

It is therefore an object of the present invention to provide a mechanism that predicts the outcome of each branch a plurality of times and resolves the predictions when they do not agree.

It is another more specific object of the invention to provide a multiple-prediction branch prediction mechanism for predicting the outcome of conditional branches in a computer which combines the advantages of branch history table with a decode history table to attain an increase in performance in the computer while at the same time minimizing the hardware overhead usually associated with increased performance.

According to the present invention, referred to as multi-prediction branch prediction, a branch prediction mechanism predicts each branch at least twice, first during the instruction-fetch phase of the pipeline and then again during the decode phase of the pipeline. The mechanism uses two different branch prediction mechanisms, each a separate and independent mechanism from the other. The mechanism then describes a set of rules to predict the branch whenever the two separate branch prediction mechanisms disagree. The preferred choice for the instruction-fetch-time prediction mechanism is the BHT and the preferred decode-time prediction mechanism is the DHT. Each mechanism is preferred because, independently, the prediction accuracy of each mechanism is very high and, when combined, even higher guess accuracy rates are obtained. For example, it is not uncommon for a BHT or DHT comprised of 4K entries to successfully predict the outcome of over 80% of the branches encountered by the processor. However, other decode-time or instruction-fetch mechanisms can be substituted as desired.

It was not immediately apparent that two or more branch prediction mechanisms could co-exist in a pipelined processor. What makes the concept work is the use of a set of rules to resolve those instances where the predictions differ. The advantage of the invention is that a higher correct prediction rate is achieved than using a single prediction mechanism alone, and this is accomplished with a lower hardware overhead.

BRIEF DESCRIPTION OF THE DRAWINGS

The foregoing and other objects, aspects and advantages will be better understood from the following detailed description of a preferred embodiment of the invention with reference to the drawings, in which:

FIGS. 7A and 7B are tables summarizing, respectively, the branch history table and the decode history table instruction-fetch decode algorithms for the processors shown in FIGS. 2 and 4;

FIG. 8 is a table summarizing the integrated branch history and decode history table instruction-fetch and decode-time algorithms according to the preferred embodiment of the invention;

DETAILED DESCRIPTION OF A PREFERRED EMBODIMENT OF THE INVENTION

Figure 1:
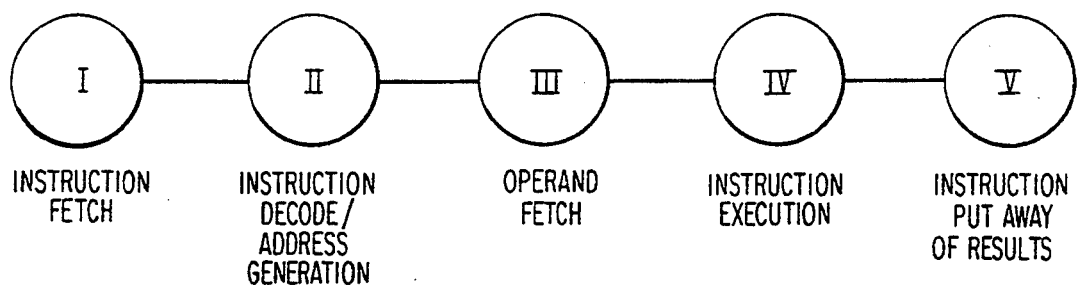
FIG. 1 is a generalized block diagram of the pipeline stages in a high performance computer.

The operations of a processor with a standard BHT or a DHT are described as a prelude to describing the operation of the present invention with multi-prediction branch prediction. As described above, the BHT must be able to predict a high percentage of its branches correctly because there is a severe penalty when it is wrong. Normally, many of the prediction errors made by the BHT are discovered only after the branch is executed. Several cycles of delay can be saved if each error can be predicted earlier. Remember, that the BHT makes its prediction during the instruction-fetch phase of the pipeline and that it can be several cycles until the branch is finally executed. By using the DHT to re-predict the outcome of each conditional branch encountered by the processor it is possible to detect a potential prediction error made by the BHT during the decode phase of the pipeline. The processor can then be redirected to the correct instruction stream thus saving several cycles of delay.

The prediction process is now explained. The BHT is used much in the manner described above while the DHT is used to confirm the branch predictions made by the BHT and, in certain cases when the predictions differ, override the prediction made by the BHT. Obviously, when both predictions are in agreement, either both taken or both not taken, there is no need to override any branch prediction. However, when the predictions for a branch differ, then a decision as to the outcome of the branch, either taken or not taken, must be made. For example, consider the case where the initial prediction made by the BHT is that the branch is "not taken" and that the DHT predicts that the branch will be "taken".

That is, let an instruction fetch made by the processor miss all "branch address" entries contained in the BHT. This suggests that there is not a taken branch contained within the datum accessed for instructions. This will direct any future instruction fetches to be made to the "fall through" path. However, let the DECODER discover a conditional branch within this datum and let the DHT indicate by its entry that the branch is taken. This event indicates that the "branch taken path" must be fetched, as predicted by the DHT. For this sequence of events, we will assume that the BHT has incorrectly predicted the outcome of the branch and that the prediction made by DHT is correct. This will then direct the DECODER to decode instructions from the "predicted target-address" path.

For the example given above, there are several reasons to allow the prediction made by the DHT to override the prediction made by the BHT:

(a) A much larger DHT, in number of entries, can be used with a small BHT and still be much smaller than the overall size of the BHT. This allows the DHT to remember the branch results from many more branches than a BHT and still be significantly smaller than the BHT. For example, a DHT with 4K entries is still only one sixteenth the size of a 1K entry BHT, (4096 bits/(1024×64) bits).

(b) The BHT functions as a depository for all "taken branch" information and, because of its fixed size limitation, suffers from the same hit and miss statistics as does the cache. Recall that the instruction-fetch address must match one of the branch addresses contained in the BHT to be a hit, whereas the DHT is accessed by using a subset of the address bits of the branch and always makes a prediction.

(c) The BHT must record all taken branches, both conditional and unconditional, whereas the DHT must only record the outcome of conditional branches. Recall, all unconditional branches can be correctly predicted by the DECODER and need not have their branch results stored as part of the DHT information. Thus, a BHT has many more distinct branches to predict than does a DHT. This aggravates the already "cache like" miss phenomena associated with a finite BHT directory.

(d) All "new" (first time) taken branches will be a miss to the BHT but can still be contained in the DHT because of its larger size. These "new" branches may represent the initial execution of a branch or the re-execution of a branch that has aged out of the BHT because of its finite size. These conditions allow a DHT to correctly redirect the DECODER on conditional branches that are actually taken and have been predicted as "not taken" by the BHT.

By predicting each branch twice, using a BHT at instruction fetch time and a DHT at decode time, it is possible to actually increase performance of the processor while decreasing the overall hardware of the machine. For example, a DHT with 16K entries working in conjunction with a BHT with 1K entries represents significantly less hardware than a BHT with 2K entries. Also, the 1K BHT and 16K DHT can predict a greater percentage of the branches correctly and thus provide an increase in performance over a larger BHT.

The description presented with reference to the drawings is basic, and it will be understood by those skilled in the art that many of the actual features that make up a processor's design have been simplified or omitted. For example, fully associative directories are chosen for the BHT rather than more conventional set associative lookups that may be required in an actual implementation. A more detailed description of a BHT can be found in U.S. Pat. Nos. 3,559,183 and 4,679,141, and a more detailed description of a DHT can be found in U.S. Pat. No. 4,477,872.

Figure 2:
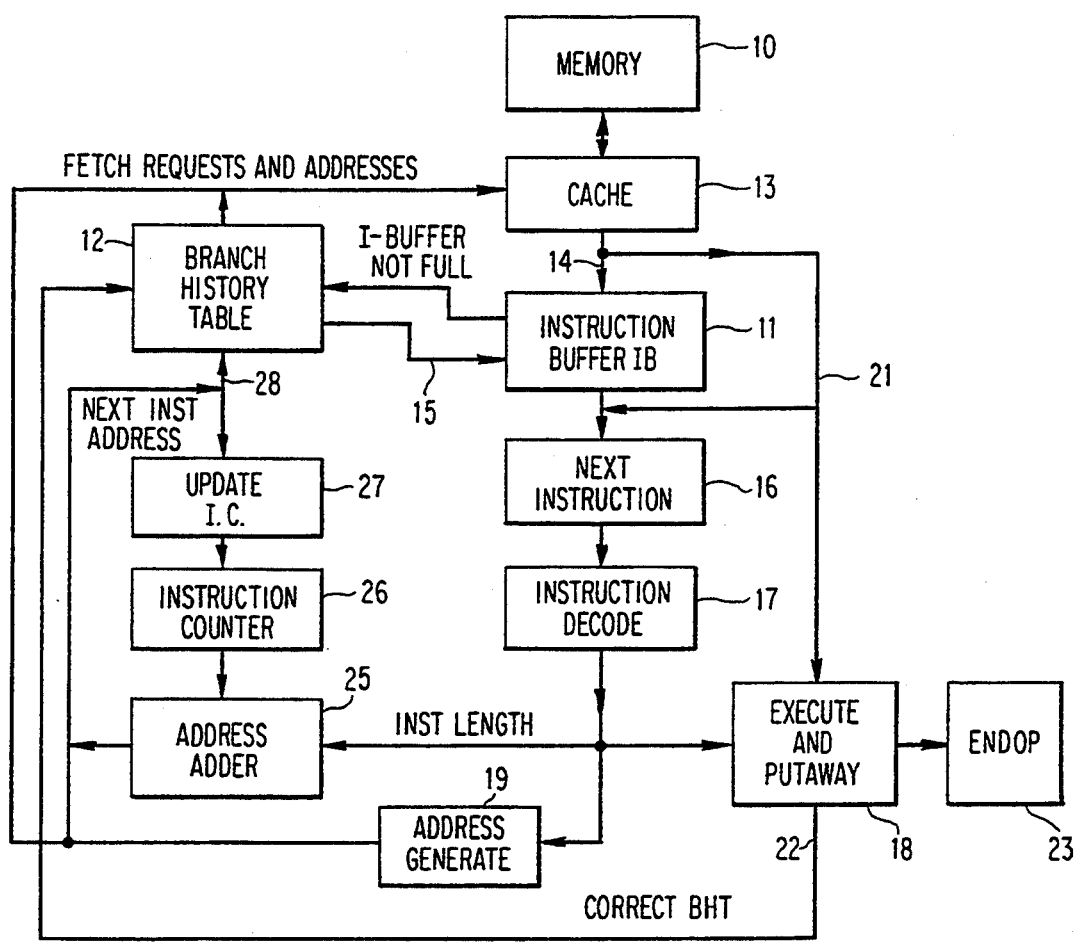
FIG. 2 is a block diagram of a prior art processor with a branch history table.

In the drawings, like reference numerals represent identical or similar parts. Referring now to the drawings, FIG. 2 shows the essential features of a processor that has a BHT. The actions of each component are described in accordance with each pipeline phase shown in FIG. 1. Each phase is described separately;

however, as in any pipeline processor, all phases of the pipeline occur in parallel.

Instructions are stored in memory 10 and are fetched from the memory 10 and stored in cache 13, according to well known mechanisms. During the instruction-fetch phase of the pipeline, the instruction-buffer 11 signals the BHT 12 via the "instruction-buffers not full" signal that space is available for another instruction fetch. The BHT then generates the next-instruction-fetch and sends the address to the cache 13. The I-fetch segment is then returned from the cache via path 14.

During the decode phase, the BHT 12 signals the instruction-buffer 11 via path 15 to load the next-instruction register 16 with the appropriate next instruction. The instruction loaded can be either the instruction immediately following the previous instruction loaded, i.e., the "next-sequential instruction", or a branch-target instruction, depending of the information sent from the BHT.

The instruction decode register 17 is loaded from the next-instruction register 16. The instruction is decoded and operation code (op-code) and execution information is assembled. After decoding the instruction, the execution information is sent to the execution unit 18 where it is held until execution. If operands are required by the instruction, then the necessary information (base register values, index register, and displacements) are sent to the address generate mechanism 19. The output of the address-generate mechanism 19 is an address for an operand. The address is then sent to the cache 13. The cache then sends the operand information back to the execution unit 18 via path 21.

The instruction waits at the execution unit 18 until the needed data is available from the cache 13. There, the instruction is executed and the results are put away as required. If a branch was executed, then the BHT update information is sent from the execution unit 18 back to the BHT 12 via path 22. The BHT update information is sent to assure that the BHT is correctly predicting the outcome of each branch. Finally, the Endop (end operation) function 23 is issued to mark the point in time when the instruction is successfully completed.

In parallel with this action, the instruction-length information, generated by the decode mechanism 17, is sent to the address adder 25. There it is combined with the value from the instruction-counter (IC) register 26 to form the next-instruction address. The output from the address adder 25 is then sent to the update-instruction-counter register 27 and to the BHT 12 via line 28. The update-instruction-counter register 27 will then hold the value of the instruction to be decoded on the next cycle. This sequence of events is then repeated by the processor for the next cycle.

Figure 3:
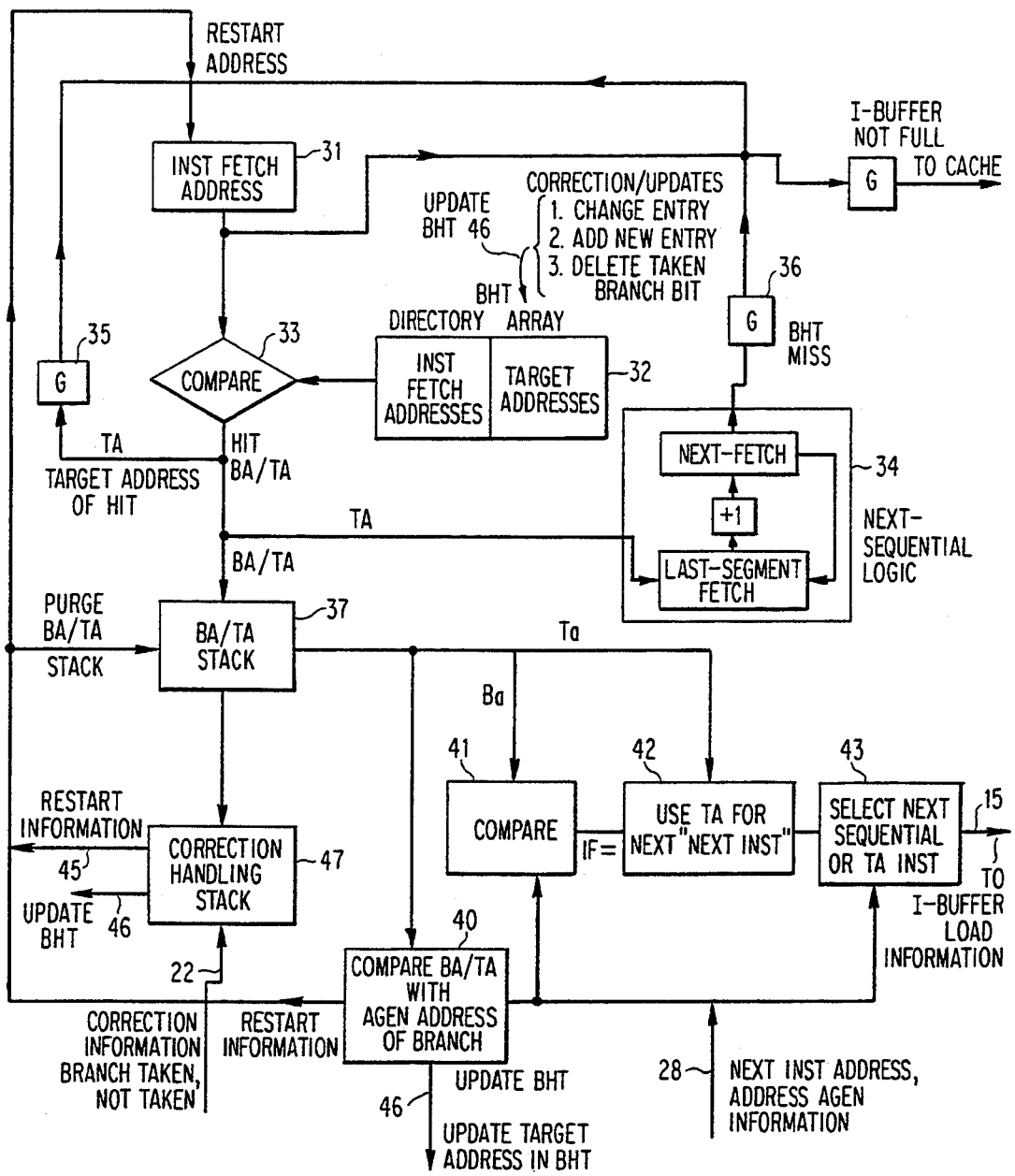
FIG. 3 is a flow diagram illustrating the operations associated with the branch history table in the processor shown in FIG. 2.

A more detailed description of a BHT is shown in FIG. 3. Essentially, the BHT is used to effectively direct the instruction fetching policies of a processor and improve branch prediction accuracy by directing the right instruction, either the next sequential or branch target, to the decoder. To do this, it must examine the address of each instruction fetch made by the processor and detect when there is a taken branch contained within an instruction-fetch segment. Each instruction fetch is held in the instruction-fetch address-register 31. This address is compared by compare function 33 against each branch address held in the BHT directory 32. Usually each instruction-fetch segment contains more than one instruction. In present machines, an instruction-fetch segment is several words long (i.e. a double word of 8 bytes or quadword of 16 bytes) thus allowing the possibility for several instructions to exist within each instruction-fetch segment. Any instruction-fetch address that matches a branch address contained in the BHT will be termed a "BHT-hit". Similarly, a "BHT-miss" is used to denote an instruction-fetch segment that misses all of the branch addresses contained in the BHT. That is, the address of the instruction fetch fails to compare with any of the instruction fetch segments held in the BHT directory.

If an instruction-fetch misses all BHT entries, then the next instruction-fetch address made by the processor is the "next sequential" instruction-fetch segment, as determined by next sequential logic 34. If the instruction-fetch address "hits in the BHT", then the processor will switch instruction streams, and the next-instruction address segment generated by the processor is the target-address of the BHT entry that caused the "hit". The new target-address goes to gate 35 and becomes the new instruction-fetch address when a BHT-hit is detected. The next-sequential instruction-fetch is called for when a BHT-miss is detected via gate 36.

If there is an address-match, a hit, then the branch-address (BA) and target-address (TA) are saved in the branch-address, target-address (BA/TA) stack 37, and the target-address becomes the next instruction-fetch address on the following cycle. The BA/TA stack is used to guide the pre-loading of instructions from the instruction-buffer to the next-instruction-register. The information to load the instruction-buffer is sent via path 15. The information, an address, used to load the instruction buffer is obtained by comparing the branch-address of the oldest entry in the BA/TA stack 37 to the next-instruction-address sent via path 28. If these addresses are equal as determined in function block 41, then the next-instruction-address should become the target-address for the BA/TA pair in the stack 37. Note, that this will happen if the BHT is correct in predicting the action of the branch. The target-address, for the BA/TA pair that matched, is held in function block 42 and signals unit 43 to select this address for the next-instruction address on path 15. If the compare in function 41 is not equal, then no select is issued and the next-instruction address from path 28 becomes the next-instruction address sent via path 15. The BA/TA pair is then removed from stack 37 and the process continues with the next oldest BA/TA pair found on the stack.

The last-segment-fetch register, inside the next-sequential fetch controls next sequential logic 34, is loaded with the target-address value. Whenever a "next-sequential" instruction fetch is called for, the value saved in the last-instruction-fetch register is bumped (increased by one unit) to the address of the next-instruction-fetch segment and becomes the new instruction-fetch address.

So far, the BHT description presented has assumed that each prediction made by the BHT is correct. However, the BHT will, on occasions, make incorrect decisions. Therefore, an update or correction mechanism must exist in the BHT.

BHT prediction errors can be detected after the address-generation phase of an instruction or after the execution phase. BHT prediction errors that are discovered after the branch is executed incur the full pipeline delay. A signal to "restart the pipeline" is sent by the execution unit to the BHT whenever it is discovered that the outcome of a branch is different from the predicted action, taken or not taken. The restart information along with BHT correction information is sent via path 22. The pipeline can be "restarted earlier" by detecting a BHT error after the instruction decode and AGEN phase of the pipeline. This avoids several cycles of pipeline delay that would result by detecting a branch prediction error in the execution unit after the branch is executed.

It is noted that a BHT prediction error can be detected at decode time whenever the BHT has predicted that there is no branch, a BHT miss, and the DECODER then decodes an unconditional branch. This information can also be sent to the BHT via path 22.

An error in predicting the target-address of a branch can be detected after the address-generate function 19 and is made available to the BHT 12 via path 28, as shown in FIG. 2. Whenever a branch is decoded by the decode function 17, the target address of the branch (the output of the address-generate function 19) is sent to the BHT 12 and compared against the predicted target-addresses held in the BA/TA stack 37 in FIG. 3. This logic is contained in function 40 of FIG. 3. Whenever the TA from the address-generate function 19 does not agree with the predicted TA, a correction is necessary. The target-address saved in the BHT entry must be changed to reflect the new, or current, target-address of the branch instruction. Corrections are sent via path 46 to the BHT directories 32. Pipeline restart information is sent via path 45 and is used to reload the I-fetch-address register 31 and purge the BA/TA stack 37. The effects of a pipeline restart are discussed below.

BHT corrections are also detected after the execution phase of an instruction. Correction information is sent via path 22. Here, the outcome of each branch, either taken or not taken, is sent to the BHT and compared against the predicted status of each branch currently held in the BA/TA stack 37. This is done in unit 47. If an error was in failing to predict a taken branch, then a new entry is made in the BHT directory. The new BA/TA information is sent to the BHT via path 46. If the error was predicting that a branch will be taken and if it is in fact not taken, then the BA/TA entry currently held in the BHT must be deleted. This correction information is also sent to the BHT via path 46.

Once a prediction error has been detected in the processor, the pipeline will have to be restarted. For example, consider the case were a branch was predicted as not taken and the branch was actually taken. The instruction fetching mechanism of the BHT was such that the target of the branch was never fetched and now the pipeline is idle until the correct instruction information is fetched and put in the instruction buffer. Once the correct instruction is fetched from the cache, the normal pipeline flow can continue. To accomplish this "pipeline restart", information is sent via path 45. The restart logic will cause the instruction-fetch-address 31 to be loaded with a new instruction address (in this case the target of branch). This allows the instruction-fetching sequence to begin anew. The "pipeline restart" procedure also causes the instruction-buffer 11 in FIG. 2 to be purged and the BA/TA stack 37 in FIG. 3 to be emptied. The processor then waits until the correct instruction (contained in the restart address) is fetched from the cache and the normal pipeline flow can continue. It is noted that there are several policies that can be implemented to restart the pipeline. Many policies are more complicated than then one described above. For example, the instruction-buffer 11 may already contain the correct instructions to restart the pipeline and execution can proceed by fetching these instructions from the instruction-buffer with little or no delay. Additional hardware would be needed to accomplish this. However, in this embodiment a simple restart procedure is used and it is assumed that the pipeline is restarted after each BHT error.

Figure 4:
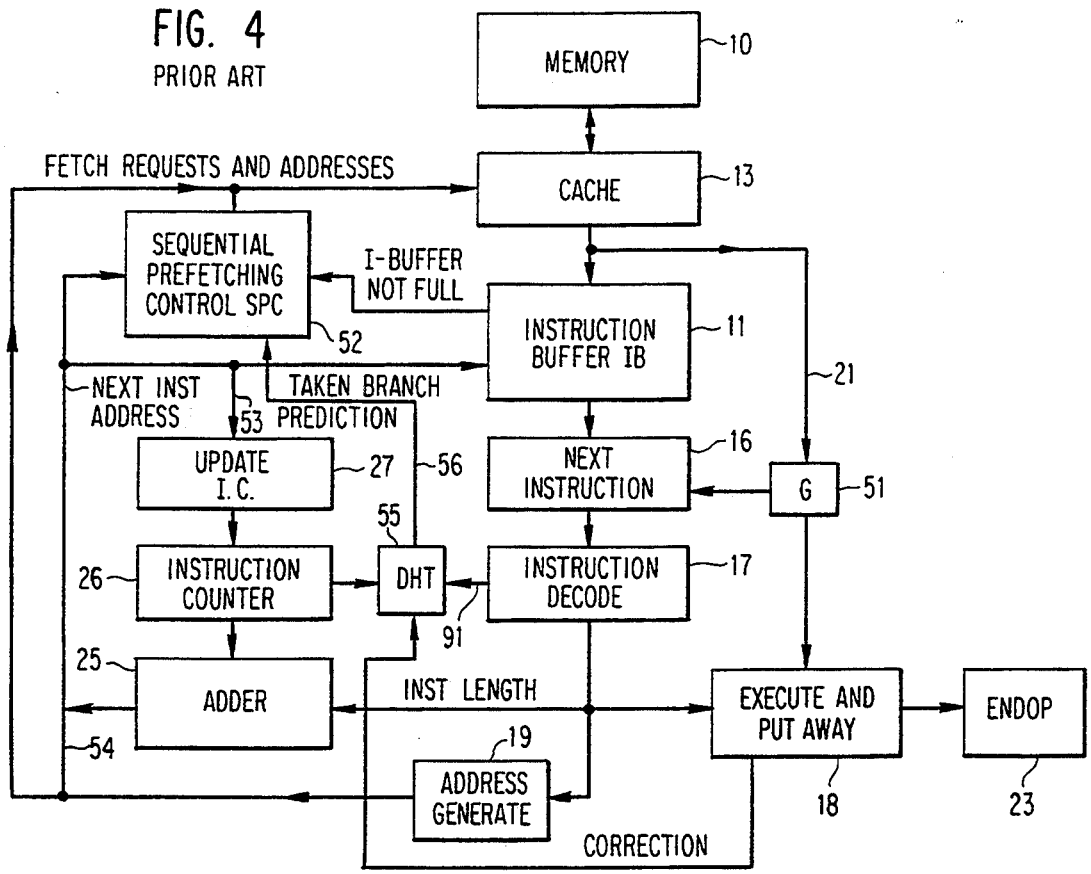
FIG. 4 is a block diagram of a prior art processor with a decode history table.

A description of the actions of a processor with a DHT is presented next. FIG. 4 shows the essential features of a processor with a DHT. The figure shows that a processor with a DHT shares many of the features found in a processor having a BHT. However, the main difference is that the DHT only predicts the outcome of each conditional branch, either taken or not taken, and that the instruction fetching logic of a BHT is replaced with a much simpler mechanism that can only generate "next sequential" fetches.

Most of the components in a processor with a DHT have a similar function as was found in a processor with a BHT. However, there are some important differences. The cache 13 again supplies instruction-fetch information to the instruction-buffer 11. The instruction-buffer (IB) 11 holds the instruction-fetch segments that have been returned from the cache 13. There can be a multiple of instruction buffers. Each separate IB is used, as in any multi-instruction stream processor, to hold restart information (to restart the pipeline if the prediction made by the DHT is wrong), instruction-fetch information (instruction-fetch segments for each instruction stream currently in the pipeline) and alternate instruction path information. For example, a detailed description of a multi-instruction stream multi-instruction buffer processor can be found in U.S. Pat. No. 4,200,927. The next-instruction register 16 is loaded from the instruction buffers. The instruction-buffers use the next-instruction address, which is input to the update-instruction-counter (update-IC) 27 to determine which instruction to load into the next-instruction-register 16.

The instruction decode logic 17 produces the following outputs:
provides the execution unit with execution information about the instruction.
provides the address generate function with operand information (base register, index register, and displacement values).
provides the address adder 25 with instruction length information.

The address-adder 25 then combines the instruction-length value with the instruction-counter value 26 to produce the next-instruction address. This value is then saved in the update-instruction-counter 27. Operand addresses are computed in the address-generate unit 19, and the fetch requests and addresses are sent to the cache 13. Operands are returned to the execution unit 18 via path 21. There, the instruction is executed and the results put away. The Endop unit 23 then signals the completion of the instruction.

Consider now that the decoder 17 detects an unconditional branch. The target-address of the branch (which is an instruction) is fetched from the cache 13 and the target instruction is loaded into the next-instruction register 16 via path 21 and gate 51. The target-address of the branch is made available from the address generate-mechanism 19. The target-address is also sent to the update-IC 27, and the sequential-prefetching-control (SPC) 52 via paths 53 and 54, respectively. The SPC 52 will then begin to fetch instruction segments starting with the "new" target-address of the branch.

If the decoder 17 detects a conditional branch then the DHT 55 will be accessed via path 91 to predict the outcome of the branch, either taken or not taken. The DHT 55 uses a subset of the address bits, contained in the instruction-counter 26, to examine the DHT array contained in the DHT 55. If the prediction of the branch "is taken", then the target-address is fetched similarly as was the target-address for the unconditional branch. That is, the target-address is fetched from the cache 13 and the target instruction is loaded into the next-instruction register 16 via gate 51. The target-address is also sent to the update-IC 27 via path 53, and the DHT 55 signals the sequential-prefetching-control 52 via path 56 to reset its instruction-fetch address to the predicted-target-address of the branch to begin new next-sequential fetches. The target-address of the branch is sent to the SPC 52 via path 54.

Figure 5:
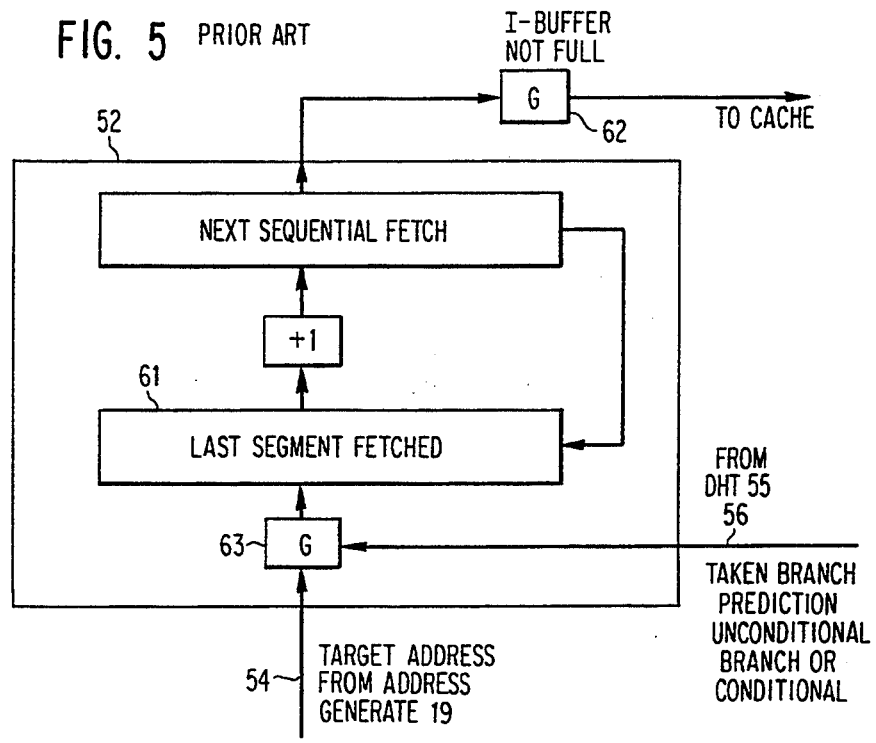
FIG. 5 is a block diagram of the sequential prefetching logic control in the processor shown in FIG. 4.

Instruction-fetch logic is contained in the sequential-prefetching-controls (SPC) 52. FIG. 5 gives a more detailed description of this mechanism. Here, the address of the last instruction-fetch is saved in the last-segment-fetched register 61 and whenever the instruction buffers signal the SPC 52 that space is available for another instruction-fetch, via gate 62, the next-sequential instruction-fetch-address is generated and sent to the cache 13. Whenever an unconditional branch or a predicted-taken conditional branch is decoded and the SPC 52 is signaled via path 56 to reset its instruction-fetch-address to the target-address of the branch instruction, the last-block-fetched register 61 is loaded with the target-address of the branch. This address is provided by the address-generate function 19. Thereafter, all next sequential fetches can be generated from within the SPC 52. The target-address is sent to the SPC 52 via path 54 and loaded through gate 63 on a signal from the DHT 55, via path 56, that an unconditional branch or predicted taken conditional branch was decoded.

Figure 6:
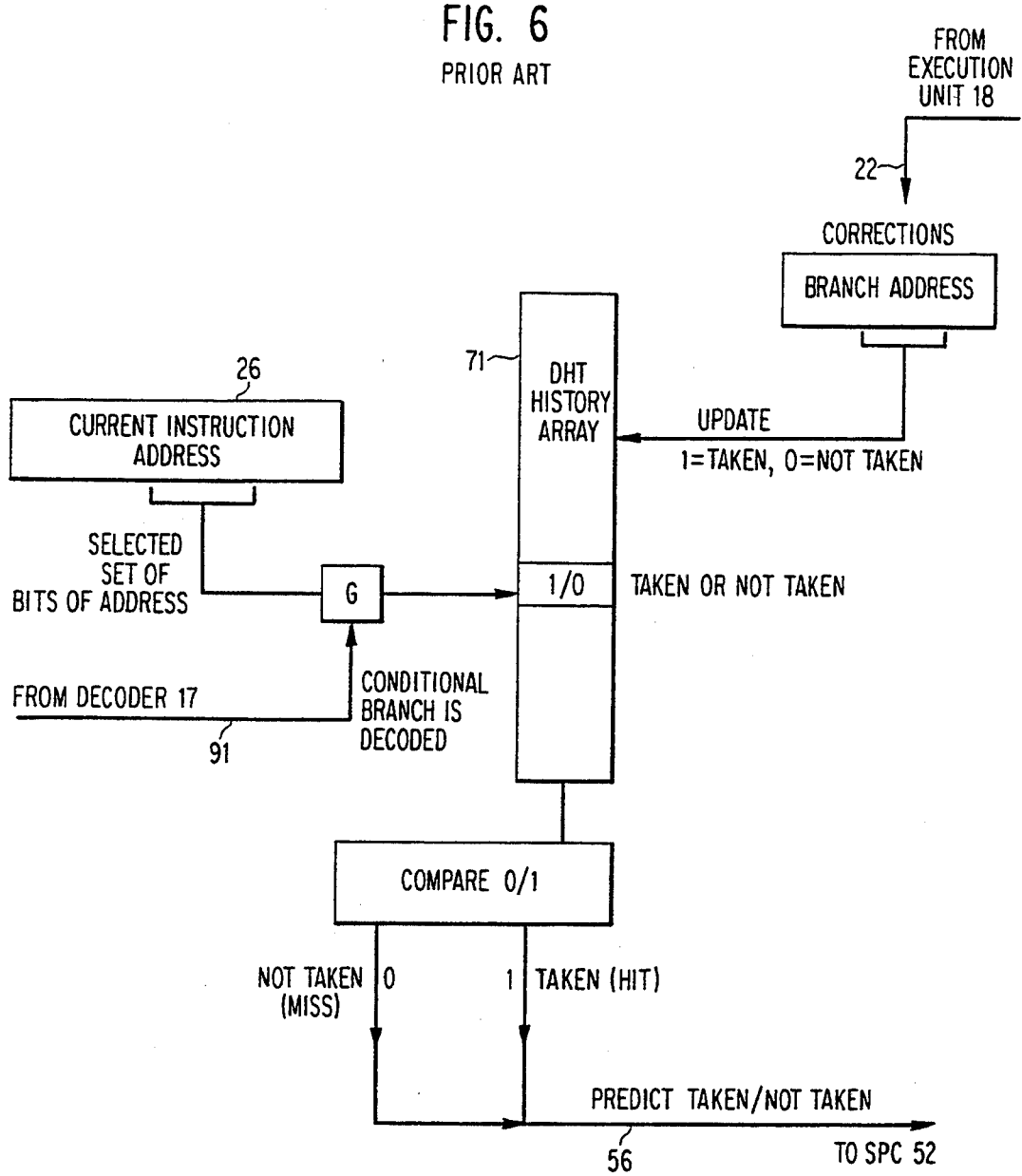
FIG. 6 is a block diagram of the decode history table in the processor shown in FIG. 4.

Branch predictions are made by the DHT 55. FIG. 6 gives a more detailed description of a DHT. As mentioned above, only conditional branches are predicted by the DHT since all unconditional branches can be correctly predicted once they are decoded. The DHT is signaled from the decode-function 17, via path 91, whenever a conditional branch is decoded. The DHT array 71 is accessed by using a subset of the bits that represent the instruction address, held in the instruction-counter register 26. Each array entry consists of only a single bit whose value represents the outcome of a branch at this memory location, up to the size of the table. For example, if the entry examined in the DHT array 71 is a one (a DHT hit) then the branch is guessed taken, or if the value found is a zero (a DHT miss) then the branch is guessed not taken. Here, the terms "DHT-hit" and "DHT-miss" correspond to the terms used for a BHT, i.e., a "BHT-hit" and "BHT-miss", and denote if the branch is predicted as taken or not-taken, respectively DHT correction information is sent to the DHT from the execution unit 18, via path 22. The correction information contains the results of the branch's execution, either taken or not taken, and the address of the branch. The DHT is updated using this information. Since the DHT only predicts the action of each conditional branch, only the execution results of each branch needs to be returned to the DHT.

A general description of the operation of a processor with a BHT or DHT has been presented. FIGS. 7A and 7B shows sets of rules in tabular form that summarize the events and actions that occur in these processors. The events are listed according to decode-time and instruction-fetch time actions, and BHT and DHT hit or miss results. For example, the FIG. 7A shows that a "BHT-hit" (a prediction of taken) causes the instruction fetching mechanism to switch to the target-address of the branch (at instruction-fetch time). However, on a BHT-miss, the instruction fetching mechanism will continue to fetch instructions down the next sequential path. During the decode phase of the pipeline, the decoder will switch to the target-address stream as identified by the BHT-hit or continue to decode down the next sequential path if no BHT entry was found (a BHT-miss).

The actions taken for a processor with a DHT are different, as shown in FIG. 7B. During the instruction fetch phases, the instruction-fetch mechanism can only fetch the next-sequential instructions regardless of any prediction outcome. However, if a branch is discovered at decode time and predicted as taken (a DHT hit) then the instruction fetching mechanism will begin to fetch instruction segments down the target-address path. Similarly, the decoder will switch to decode instructions down the target-address path when a DHT hit occurs. If the prediction is a DHT miss, then the processor will continue to fetch instructions down the next-sequential path and also decode the fall-through instruction on the next cycle.

Next a specific embodiment for the current invention, a multi-prediction branch prediction mechanism, is presented. This mechanism uses both a BHT and DHT to predict branches and in so doing improves the prediction process by offering features that neither prediction mechanism (DHT/BHT) can provide separately. These extra features will then improve overall branch prediction accuracy and thus improve performance. FIG. 8 shows a table that summarizes the events and actions that describe the current invention. Each BHT-hit is now divided into two categories: an "active-taken-hit" and a "ghost-hit".

Figure 9:
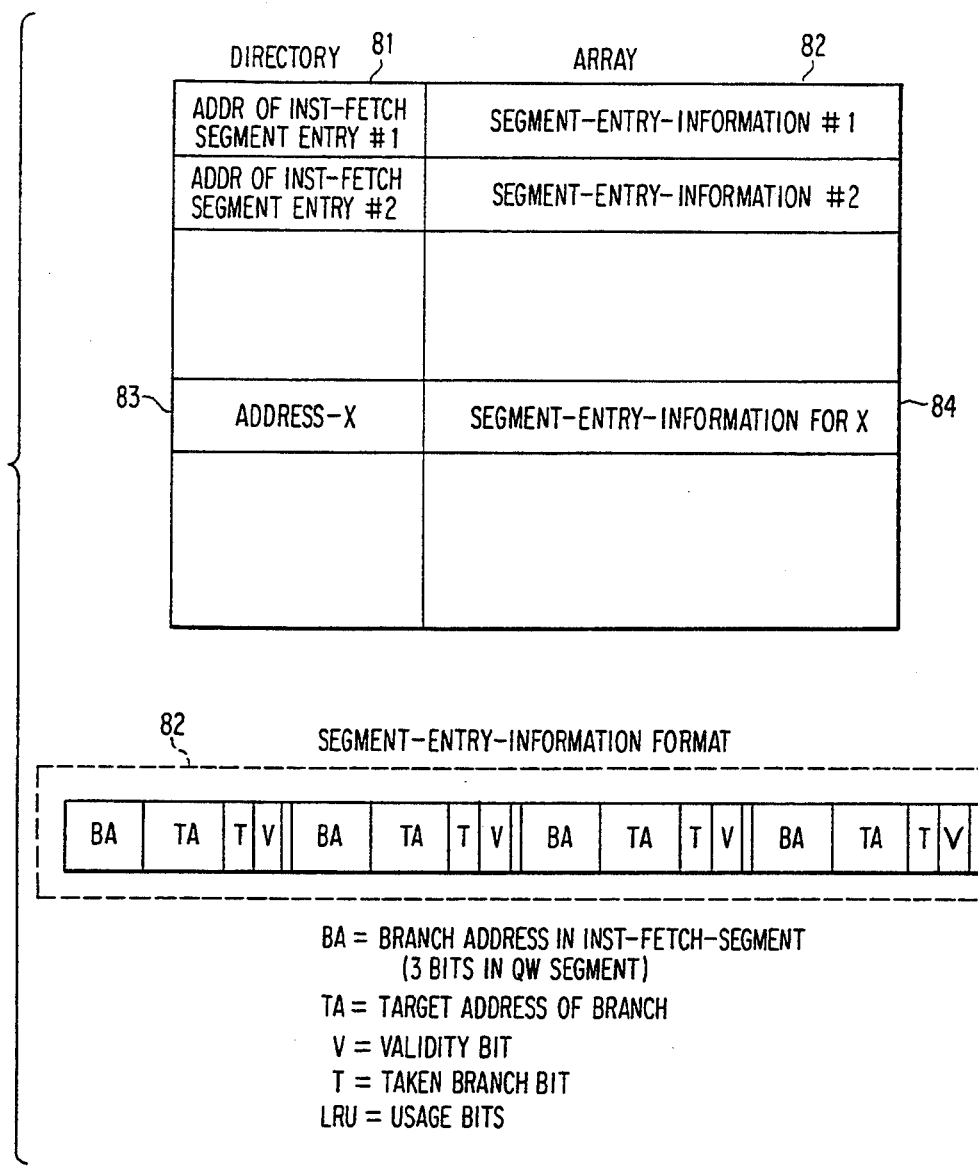
FIG. 9 is a table illustrating the branch history table directory and segment entry information according to the invention.

An active-taken-hit is used to describe what was previously called a BHT-hit. That is, the instruction fetch address matches the branch address saved in the BHT and the branch is currently taken. However, a "ghost-hit" describes when the instruction-fetch address matches a branch address saved in the BHT but the branch is no longer taken. FIG. 9 is used to explain these differences in detail. The figure shows the format for the BET directory, array, and block entries. Each directory entry 81 represents the address of an instruction-fetch segment that contains as least one previously executed taken branch. The array information 82, associated with each directory entry, identifies (a) the address of each taken branch contained within an instruction-fetch segment, (b) the target-address of each branch, (c) a taken, not-taken bit, (d) a valid bit, and (e) LRU usage bits.

Consider a taken branch contained in an instruction fetch segment will address X. It will have a value of X in the BHT directory 83 and corresponding segment information 84. Note that the directory entry represents the address of an instruction-fetch segment, and so a multiple of taken branches can exist within each segment. Recall that each instruction-fetch-segment is usually several words long and thus contains several instructions. The array-segment-entry information then contains information identifying each taken branch found within each instruction-fetch segment. FIG. 9 shows that each segment entry can identify up to four taken branches within an instruction-fetch segment. This is more that adequate for instruction-fetch segments of a quadword (16 bytes). Each sub-segment entry contains information identifying the branch address within the instruction-fetch segment. This field needs to be only three bits wide to identify an instruction within a quadword segment in the IBM S/370 architecture since instructions can only begin on each halfword boundary. The target-address must be a full instruction address since a branch can branch to any instruction-fetch segment. However, it is noted that the target-address can be abbreviated or truncated when stored in the BHT. It is possible to save only a subset of the low order bits that make up the full target-address. The full target-address can then be reconstructed by concatenating the current high order bits from the instruction-counter register to the low order bit saved in the BHT. This technique tries to take advantage of the observation that branches typically jump a short distance and very little accuracy will be lost in generating the full target-address from only a reduced set of address bits.

The valid bit is used to denote which of BA/TA pairs in each block, up to four, are valid. As mentioned above, provisions are provided to remember up to four branch address within each instruction-fetch segment.

The taken bit is needed because a branch can change its actions. That is, initially a branch must be taken to be entered into the BHT. However, in subsequent executions the branch can fail to be taken. This action would result in a BHT correction. Recall that a BHT correction occurs for all branches that are predicted as taken and then fail to be taken when executed. The correction mechanism must then "turn off" the taken bit for this BHT entry. If an instruction fetch segment matches a branch address with a "taken bit" turned off, then a ghost-hit is identified. Ghost hits are used to describe a hit to a BHT entry (a branch) that is no longer taken.

The usage bits are needed because an instruction-fetch segment can contain more than four taken branches. If this occurs, then a replacement mechanism will be used to keep the most currently referenced branch addresses and discard the branch address that was referenced the furthest time in the past. Typically, a least-recently-used (LRU) algorithm or form of LRU algorithm is used as the replacement algorithm.

Returning now to FIG. 8, we see that each BHT prediction (hit, ghost-hit, miss) is now paired with a DHT prediction (hit or miss). The events are listed according to the instruction-fetch and decode-time phases of the processor.

For example, a valid-BHT-hit causes the instruction fetch mechanism to fetch the target of the branch found in the BHT. This occurs regardless of the DHT prediction, hit or miss. At decode time, the processor will switch to decode instructions from the target-address path. Instructions from the target-address path will be decoded by the processor for either a DHT hit or miss.

However, each "ghost-hit" prediction (at instruction-fetch time) causes the instruction-fetch mechanism to continue to fetch instructions from the next-sequential path. During the decode phase of the pipeline, the processor will continue to decode down the next-sequential path regardless of the DHT prediction, a hit or a miss.

For a BHT-miss, the processor will continue to fetch the next-sequential segments. At decode time, if the DHT also predicts that the branch is not taken, then the processor will continue to decode instructions from the next-sequential path. However, if the initial prediction made by the BHT was a miss (not taken) and the DHT predicts that the branch will be taken, a DHT hit at decode time, then the processor will stop fetching the next-sequential path and switch to fetch instructions from the target-address path. Note that the target-address of the branch is available from the address generate function. When the target-address instructions are available in the instruction-buffer, the DECODER will also switch to decode instructions from the target address path identified by the branch.

Figure 10:
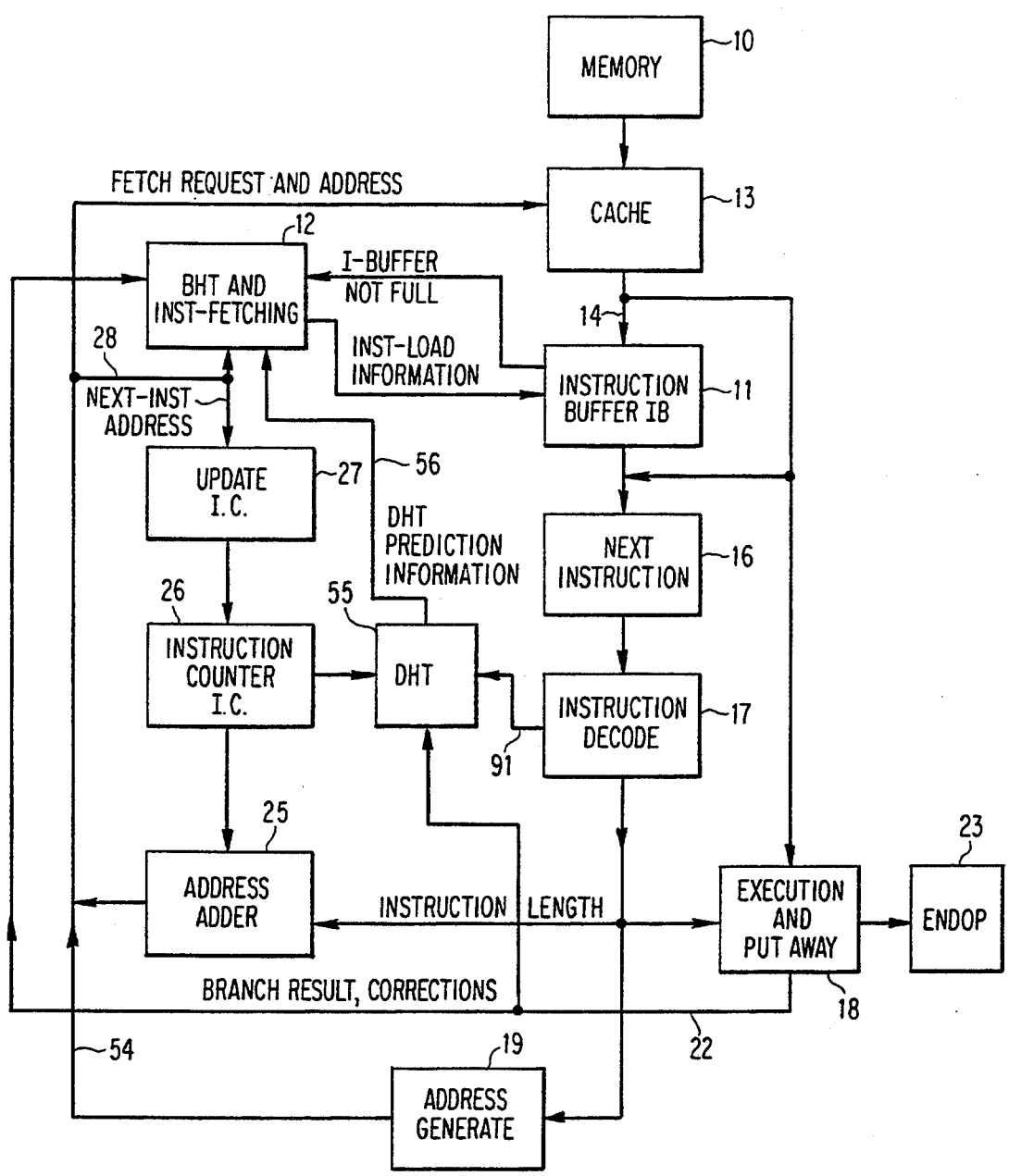
FIG. 10 is a block diagram of a processor with both a branch history table and a decode history table according to the preferred embodiment of the invention.

FIG. 10 shows the features of a processor according to the preferred embodiment of the invention that uses both a DHT and BHT for branch prediction. Most of the features in the figure have a similar functions as was described for a processor with just a BHT (FIG. 2) or a processor with a DHT (FIG. 4). For example, the cache 13 supplies instructions to the instruction-buffer 11 as well as operands to the execution unit 18. The next-instruction-register 16 contains the next instruction to be processed by the instruction-decode-mechanism 17. The BHT 12 performs branch prediction, controls instruction fetching and directs the flow of instructions through the pipeline. The BHT 12 signals the instruction-buffer 11 to load the next-instruction-register 16 with the appropriate next instruction, either the next-sequential-instruction or branch-target-instruction. The next-instruction fetch is generated by the BHT 12 on a signal from the instruction buffer 11 that space is available. The next-instruction fetch can be either the next-sequential address or the target-address of a branch instruction, depending on the results of the previous instruction-fetch, a BHT-hit or BHT-miss.

The operations of the DHT 55 are similar to the operation of a DHT described in FIG. 4. That is, the DHT 55 predicts conditional branches during the decode phase of the pipeline and signals the BHT via path 56 of the branch prediction results, either a hit or miss. Along with the branch prediction results, the address of the branch as well as the target-address of the branch is also supplied via path 56. This information will be used by the instruction-fetching logic in the BHT 12 to verify that the branch-predictions made by the BHT (made during the instruction-fetch phase of the pipeline) are correct. However, it is noted that the target-address of the branch is already supplied to the BHT 12 via path 28 and need not be duplicated via path 56. By including this information in the signal on path 56, the pipeline-restart and instruction-fetching-logic are simplified.

The DHT 55 is signaled via path 91 from the instruction-decode-function 17 whenever a conditional branch is decoded. The address of the branch is supplied to the DHT 55 from the instruction-counter register 26. BHT and DHT corrections are signaled via path 22 from the execution unit 18. The address-adder mechanism 25 takes as its input the address of the current instruction being decoded, found in the IC register 26, and the length of the instruction being decoded and computes the next-instruction address. The new address is saved in the update-IC register 27. The DHT prediction logic for determining if a branch is taken or not-taken is the same as described in FIG. 6. This information is combined with the branch prediction logic found in the BHT to provide an improved branch scheme that neither a BHT or DHT can provide alone.

Figure 11:
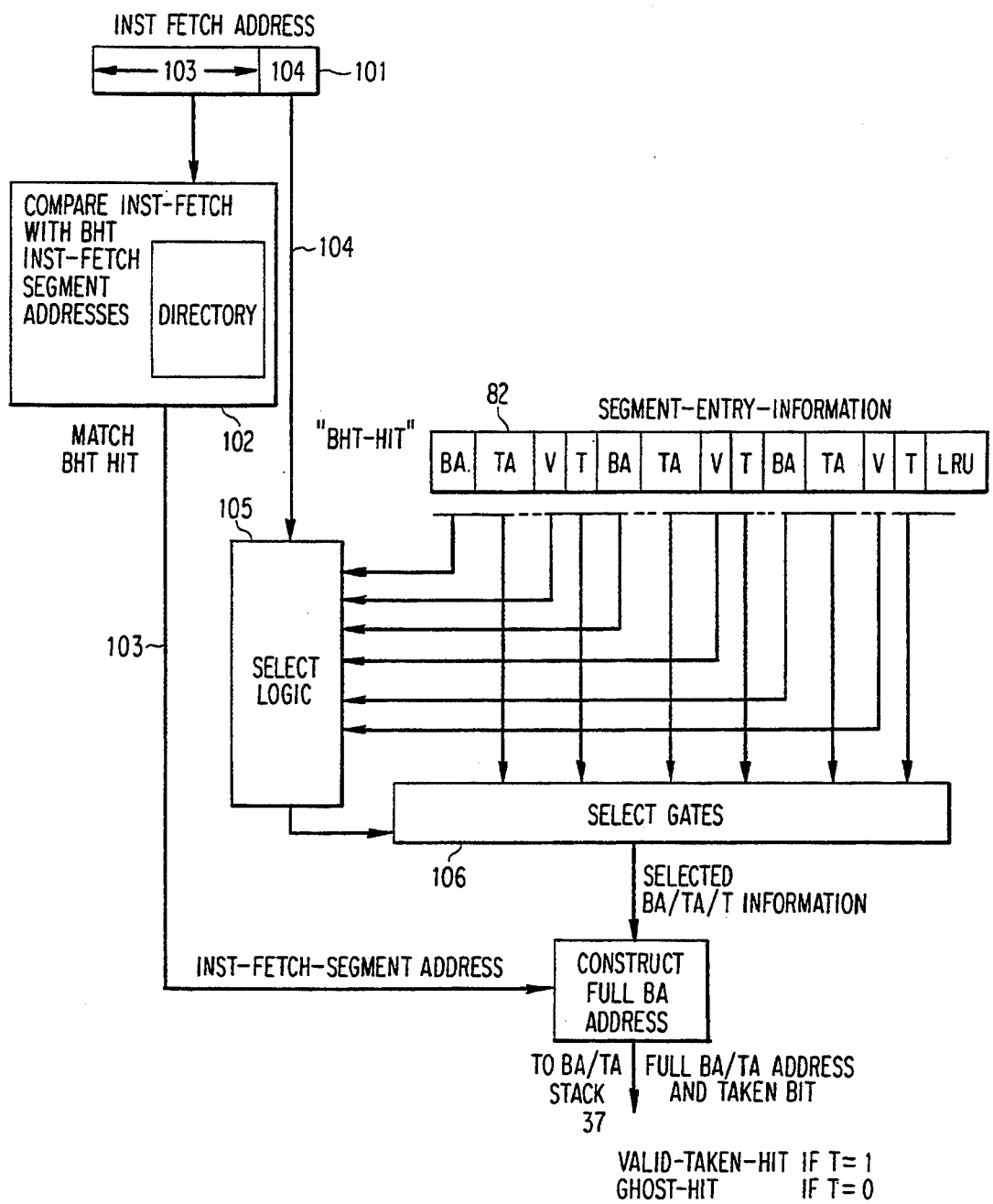
FIG. 11 is a block diagram illustrating the branch address/target address selection mechanism used in the preferred embodiment of the invention.

Several changes are made to the BHT as described in FIG. 3. FIG. 11 shows in detail how the correct BA/TA pair is selected from the BHT entries as described in FIG. 9. A "BHT-hit" is the result of an instruction-fetch-address 31, in FIG. 3, matching the address of an instruction-fetch-segment saved in the BHT 82, of FIG. 9. The comparative logic is contained in function 102. The instruction-fetch-address used in the comparison can be divided into two parts, 103 and 104. Part 103 is used to compare against each instruction-fetch-segment saved in the BHT. This portion of the address need only specify the address of an instruction-fetch down to a double-word or quad-word, depending of the width of the address-fetch bus used to fetch instruction from the cache or memory. Part 104 represents a sub-address (SA) portion of the instruction-fetch address and identifies which instruction within an instruction-fetch-segment caused the BHT entry. This instruction would be a taken branch. This part of the address is not immediately needed in detecting a "BHT-hit". It is only used after an initial match of the instruction-fetch-address and the instruction-fetch-segment saved in the BHT. After a "BHT-hit" is detected, the correct branch within the instruction-fetch segment must be selected. Recall, there can be several taken branches within each instruction-fetch-segment.

The desired branch is identified as the closest branch encountered after the instruction fetch address. The appropriate branch address is selected by the select logic 105 according to the following rules:

Subtract the SA field from each BA field in the identified BHT-segment.
Disregard negative and invalid differences.
Select the BA with the smallest or zero difference.

The full BA is then created in the select gate logic 106. The selected BA 104 value from the select logic 105 is appended to the instruction-fetch-address 103 to create the full branch address. This address is then paired with the appropriate TA to form a BA/TA pair. The BA/TA pair represents a "ghost-hit" if the taken-bit is zero, T=0, or a valid-taken-hit if T=1. The selected BA/TA pair is then saved in the BA/TA stack 37 of FIG. 3 to guide the later selection of the "next-instruction" from the instruction-buffer 11 into the next-instruction-register 16 of FIG. 2. The selected target-address is also gated to two other locations. First, the TA is used to update the next-instruction-fetch-address 31 of FIG. 3. Second, the target-address is used to reset the next-sequential-instruction-fetch control 34 of FIG. 3.

Figure 12:
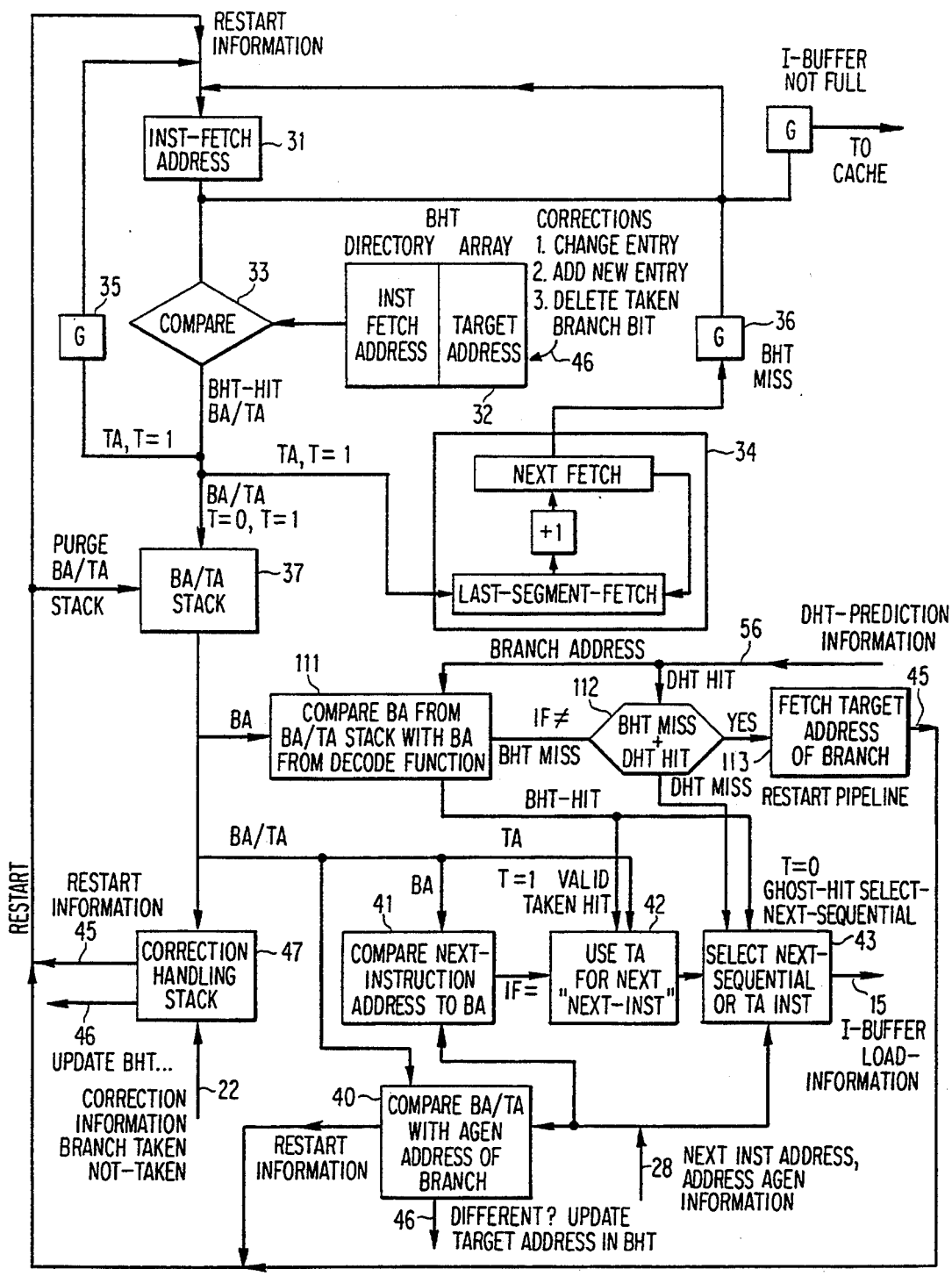
FIG. 12 is flow diagram showing the branch history table and decode history table logic.

FIG. 12 gives a detailed description of the prediction logic that uses a DHT and BHT. Parts of the logic are similar to the prediction logic described in FIG. 3. Again, each instruction-fetch address, contained in next-instruction fetch-address 31, is compared against each instruction-fetch-segment contained in the BHT. The comparative logic is contained in function 33. When a match is detected, a "BHT-hit", the appropriate BA/TA address is saved in the BA/TA stack 37. Both valid-taken-hits (the taken-bit T=1) and ghost-hits (T=0) are saved in the BA/TA stack. These BA/TA address pairs are used to guide the loading of the next-instruction-register 16 from the instruction-buffer 11 with the appropriate next-instruction.

If the "BHT-hit" is a valid-taken-hit (T=1), then the TA will also be sent to the instruction-fetch-register 31 and to the next-sequential-fetch mechanism 34. The selected TA becomes the next-instruction-fetch on all valid-taken-hits and is also used to reset the next-sequential-fetch controls 34.

The prediction results of the DHT, provided via path 56, and the prediction made by the BHT, provided by the BA/TA stack 37, are examined in function 111. The BA of the oldest entry in the BA/TA stack 37 is compared to the address of the branch just decoded. If these addresses are not equal then the processor has decoded a branch that the BHT has predicted as not taken, a BHT-miss. The processing logic then proceeds to function 112 where the prediction made by the DHT is examined. If the DHT predicted that the branch will be taken, then it is assumed that the prediction made by the BHT is incorrect and the correct prediction is the DHT's. This causes the pipeline to be restarted, function 113, and the instruction-fetch and decode-time policies for a BHT-miss and DHT-hit described in FIG. 8 are enforced. The target-address of the branch just decoded becomes the next-instruction-fetch address, and the pipeline proceeds down the target-address path. Recall, that the DHT can remember the outcome of a larger number of branches than a BHT and still be smaller in size. Thus, the prediction of branch not taken, a BHT-miss, can be the result of a taken branch that has aged out of a small BHT and is still retained in a large DHT.

If the prediction made by the DHT is not-taken, then function 43 is signaled to load the instruction following the branch as the next-instruction loaded from the instruction-buffers to the next-instruction-register 16.

Returning to the logic of function 111, if the BA from the BA/TA stack 37 equals the address of the branch being decoded, then the BHT-hit policies of FIG. 8 are implemented. If the branch is identified as a valid-taken-hit (T=1), then function 42 is signaled to use the target-address instruction as the next-instruction loaded from the instruction-buffer 11. If the BHT entry identifies a ghost-hit (T=0), then function 43 signals the next-instruction loaded from the instruction-buffers is the next-sequential or fall-through instruction.

Function 41 is again used to compare the next-instruction address, returned via path 28 against the BA of the oldest entry in the BA/TA stack 37. This guides the loading of instructions from the instruction-buffers into the next-instruction-register 16. Function 40 compares the target-address of a branch, calculated by the address-generate-function 19 of FIG. 2, with the target-address of the branch saved in the BA/TA stack 37. If the saved target-address is different than the generated target-address at decode, then the pipeline must be restarted. The restart information is sent via path 45. BHT corrections are sent to the correction-handling-stack 47. Here, the execution results of each branch, either taken or not-taken, are checked with the predicted results and updates, new-entries, or branch deletions are scheduled to the BHT via update path 46 when necessary.

Figure 13:
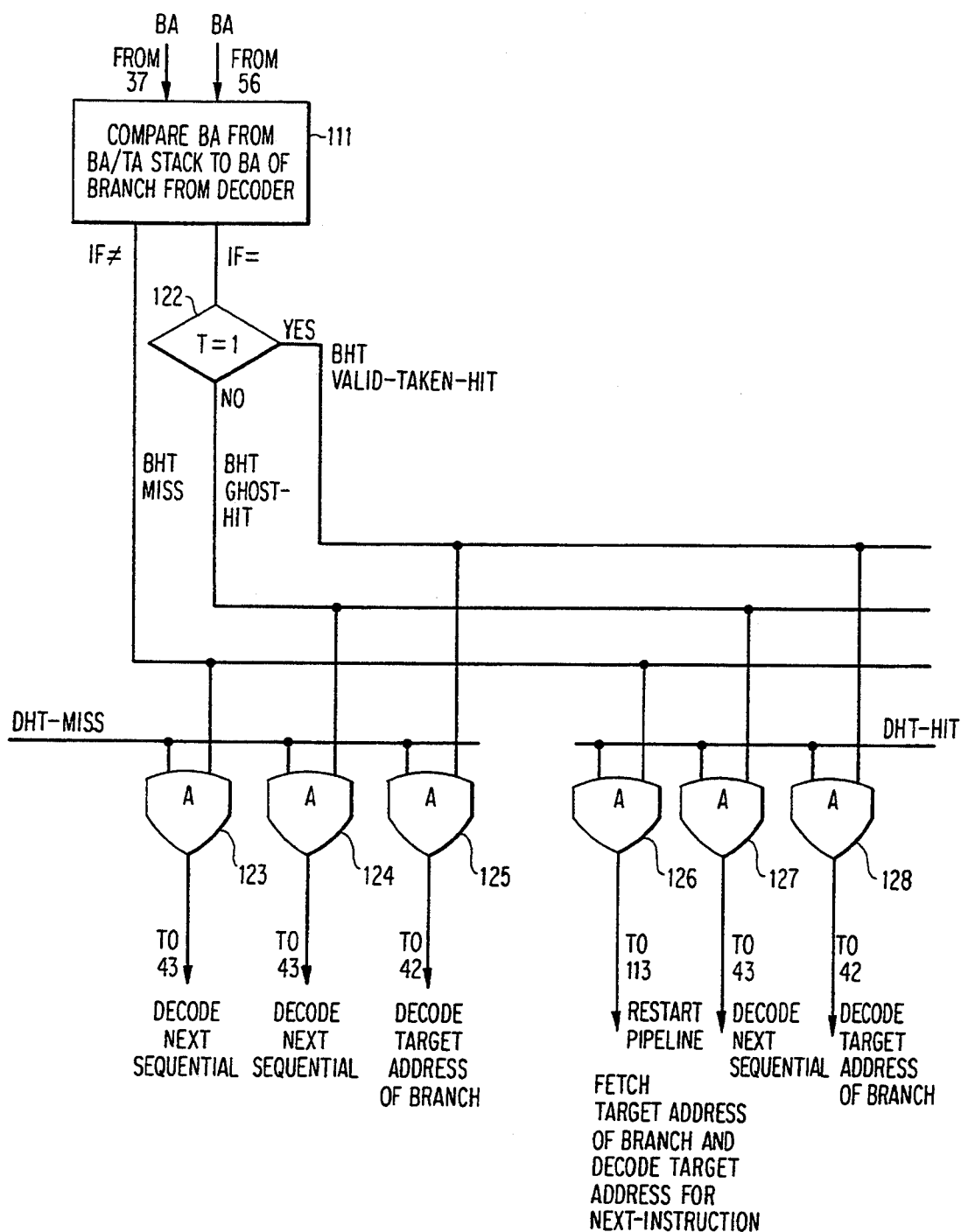
FIG. 13 is a detailed logic diagram of the branch history table and decode history table prediction mechanism.

Finally, FIG. 13 gives a detailed description of the comparative logic used to examine the predictions made by the BHT and DHT. Function 111 compares the address of the branch just decoded, sent via path 56, with the BA of the oldest entry in the BA/TA stack 37. If the addresses are equal, identifying a BHT-hit, then the taken, not-taken bit is examined in function 122. The output of function 122 determines if the selected branch is a valid-taken-bit or a ghost-hit. If the comparative logic of 122 determines that the branch address from the BA/TA stack 37 is not equal to the address of the decoded branch then a BHT-miss is identified.

The select gates, 123 to 128, determine which of the instruction-fetch/decode-time policies to follow as described in FIG. 8. Each gate represents an AND gate and the output is sent to the following units (in FIG. 12):

Unit 43 to decode the next-sequential instruction as the next instruction.

Unit 42 to decode the target-address of the branch as the next instruction.

Unit 113 to restart the pipeline. This causes the target-address of the branch to be fetched and then decoded as the next instruction.

In the embodiment described above, each branch is predicted twice, once during the instruction-fetch phase of the pipeline and then again at decode time. The embodiment then uses a set of rules that determine the prediction whenever the two independent branch prediction policies disagree. More specifically, the two branch prediction schemes described in the embodiment are a BHT and a DHT. The set of rules to arbitrate any branch prediction differences are described in FIG. 8. The BHT and DHT are a preferred choice in branch prediction policies because each separately has a very high success rate in predicting branches, and when used together, an even higher percentage of branches can be guessed successfully.

It would be a simple matter, however, to substitute one of the other branch prediction schemes as mentioned in the prior art for either the BHT or the DHT prediction scheme and still maintain the spirit of this invention. For example, branch prediction can be according to op-code type as described in U.S. Pat. Nos. 4,181,942 and 4,200,927. Either of these can be substituted for the BHT and DHT. Then, a set of rules, similar to the set of rules described in FIG. 8, is needed to resolve differences when the branch prediction schemes do not agree. In fact, a third branch prediction policy can be used to arbitrate those cases when the first two branch prediction schemes do not agree.

For example, if the predictions made by the BHT and DHT do not agree, then another branch prediction scheme (possibly predicting each branch by its op-code type) can be used to arbitrate these differences. Alternatively, a multi-prediction branch prediction mechanism can consist of three separate branch prediction policies with the actual prediction of each branch being determined by an agreement of any two. Those skilled in the art will recognize that a different branch prediction scheme can be substituted for those described for the preferred embodiment of the invention, or the existing branch prediction schemes can be modified and the invention can still be practiced, with modification, within the spirit and scope of the appended claims.

Having thus described our invention, what we claim as new and desire to secure by Letters Patent is as follows:

1. A multi-prediction branch prediction mechanism for predicting the outcome of branch instructions in a computer having a pipeline processor having a plurality of different processing stages and including an instruction buffer connected to a memory for temporarily storing fetched instructions, an instruction decode circuit connected to said instruction buffer and decoding instructions temporarily stored in said instruction buffer, an address generate circuit responsive to said decoded instructions from said instruction decode circuit addressing said memory to fetch instructions to said instruction buffer, and an execution unit responsive to decoded instructions from said instruction decode circuit for performing operations in accordance with decoded instructions, said multi-branch prediction mechanism comprising:

at least two, independent branch prediction means connected to said pipeline processor for independently predicting a branch instruction at different stages of said plurality of stages of said pipeline, said different stages corresponding to different positions of said pipeline and each having a time of processing different from one another;

means responsive to said two, independent branch prediction means for resolving those instances when predictions from each of said two, independent branch prediction means differ; and means responsive to said execution unit for updating said two, independent branch prediction means based on execution of said branch instruction.

2. The multi-prediction branch prediction mechanism recited in claim 1 wherein one or more of said at least two, independent branch prediction means comprise an instruction-fetch branch prediction means connected to said instruction buffer and to said address generate mechanism for generating an initial branch prediction based on a limited history of branches taken and supplying to said address generate mechanism a target address.

3. The multi-prediction branch prediction mechanism recited in claim 1 wherein one or more of said at least two, independent branch prediction means comprise a decode-time branch prediction means connected to said instruction decode mechanism and to said instruction-fetch branch prediction mechanism for generating a branch prediction based on a history of branches executed.

4. The multi-prediction branch prediction mechanism recited in claim 1 wherein said at least two, independent branch prediction means comprise:

an instruction-fetch branch prediction means connected to said instruction buffer and to said address generate mechanism for generating an initial branch prediction based on a limited history of branches taken and supplying to said address generate mechanism a target address; and a decode-time branch prediction means connected to said instruction decode mechanism and to said instruction-fetch branch prediction mechanism for generating a branch prediction based on a history of branches executed.

5. The multi-prediction branch prediction mechanism recited in claim 4 wherein said instruction-fetch branch prediction means comprises a branch history table (BHT) in which are stored a set of recently executed branches followed by their target-addresses and said decode-time branch prediction means comprises a decode history table (DHT) in which are stored records of actions of each branch.

6. A multi-prediction branch prediction mechanism according to claim 1, wherein said at least two, independent branch prediction means comprise first and second branch prediction means, said first branch prediction means being of a type different from that of said second branch prediction means.

7. A multi-prediction branch prediction mechanism for predicting the outcome of branch instructions in a computer having a pipeline processor including an instruction buffer connected to a memory for temporarily storing fetched instructions, an instruction decode circuit connected to said instruction buffer and decoding instructions temporarily stored in said instruction buffer, an address generate circuit responsive to said decoded instructions from said instruction decode circuit addressing said memory to fetch instructions to said instruction buffer, and an execution unit responsive to decoded instructions from said instruction decode circuit for performing operations in accordance with decoded instructions, said multi-branch prediction mechanism comprising:

- at least two, independent branch prediction means connected to said pipeline processor for independently predicting branch instructions at different stages of said pipeline, said at least two, independent branch prediction mean comprising an instruction-fetch branch prediction means connected to said instruction buffer and to said address generate circuit for generating an initial branch prediction based on a limited history of branches taken and supplying to said address generate circuit a target address, and a decode-time branch prediction means connected to said instruction decoded circuit and to said instruction-fetch branch prediction means for generating a branch prediction based on a history of branches executed;
- means responsive to said two, independent branch prediction means for resolving those instances when prediction from each of said two, independent branch prediction means differ, said means responsive to said branch prediction means comprising comparing means for comparing said initial branch prediction from said instruction-fetch branch prediction means and said branch prediction from said decode-time branch prediction means, and selection means responsive to said comparing means for accepting said initial branch prediction from said instruction-fetch branch prediction means when a match occurs between said initial branch prediction and said branch prediction from said decode-time branch prediction means but overriding said initial branch prediction by selecting said branch prediction from said decode-time branch prediction means and restarting said pipeline when said initial branch prediction and said branch prediction from said decode-time branch prediction means do not match; and
- means responsive to said execution unit for updating said two, independent branch prediction means based on execution of a branch instruction.

8. The multi-prediction branch prediction mechanism recited in claim 7 wherein said instruction-fetch branch prediction means comprises a branch history table (BHT) in which are stored a set of recently executed branches followed by their target-addresses and said decode-time branch prediction means comprises a decode history table (DHT) in which are stored records of actions of each branch.

9. The multi-prediction branch prediction mechanism recited in claim 8 wherein said means responsive to said execution unit for updating said two, independent branch prediction means based on execution of a branch instruction comprises a correction handing circuit connected to said execution unit and said branch history table and said decode history table to correct information stored in said tables based on execution of a branch instruction.

* * * * *

UNITED STATES PATENT AND TRADEMARK OFFICE
CERTIFICATE OF CORRECTION

PATENT NO. : 5,353,421
DATED : October 4, 1994
INVENTOR(S) : Emma, et al

It is certified that error appears in the above-indentified patent and that said Letters Patent is hereby corrected as shown below:

On title page, item [75] add the following inventor's name:
--Albert J. Van Norstrand, Jr., Red Hook, N.Y.--

Signed and Sealed this

Sixth Day of June, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,353,421
DATED : October 4, 1994
INVENTOR(S) : Emma et al.

It is certified that error appears in the above-indentified patent and that said Letters Patent is hereby corrected as shown below:

On the title page, item [75] insert:

"James H. Po merene" to --James H. Pomerene--;

Signed and Sealed this

Fourth Day of July, 1995

Attest:

BRUCE LEHMAN

*Attesting Officer*     *Commissioner of Patents and Trademarks*